(12) United States Patent
Stehouwer

(10) Patent No.: US 7,845,240 B1
(45) Date of Patent: Dec. 7, 2010

(54) DEVICE AND METHOD FOR DETERMINING A FLOW CHARACTERISTIC OF A FLUID IN A CONDUIT

(75) Inventor: Arjan Stehouwer, Zeewolde (NL)

(73) Assignee: Elster NV/SA, Essen (BE)

( * ) Notice: Subject to any disclaimer, the term of this patent is extended or adjusted under 35 U.S.C. 154(b) by 0 days.

(21) Appl. No.: 12/508,872

(22) Filed: Jul. 24, 2009

(51) Int. Cl.
*G01F 1/66* (2006.01)

(52) U.S. Cl. .................................. 73/861.27
(58) Field of Classification Search .............. 73/861.25, 73/861.29, 861.27; 342/42
See application file for complete search history.

(56) References Cited

U.S. PATENT DOCUMENTS

| | | | |
|---|---|---|---|
| 5,546,812 A * | 8/1996 | Drenthen ................. | 73/861.29 |
| 5,546,813 A * | 8/1996 | Hastings et al. .......... | 73/861.29 |
| 5,650,572 A * | 7/1997 | Vontz ..................... | 73/861.28 |
| 6,098,466 A | 8/2000 | Shkarlet | |
| 6,178,827 B1 * | 1/2001 | Feller ..................... | 73/861.27 |
| 7,152,490 B1 * | 12/2006 | Freund et al. ............ | 73/861.27 |
| 7,469,598 B2 * | 12/2008 | Shkarlet et al. .......... | 73/861.18 |
| 7,568,398 B2 * | 8/2009 | Feller ..................... | 73/861.29 |

FOREIGN PATENT DOCUMENTS

| DE | 19503714 | 8/1996 |
|---|---|---|
| EP | 0639776 | 2/1995 |
| EP | 1736741 | 12/2006 |

OTHER PUBLICATIONS

European Search Report dated Dec. 10, 2009 issued by the European Patent Office for related European Application No. EP09166233.

* cited by examiner

*Primary Examiner*—Jewel Thompson
(74) *Attorney, Agent, or Firm*—Ryan A. Schneider, Esq.; Troutman Sanders LLP

(57) ABSTRACT

A device for determining a flow characteristic of a fluid in a conduit comprises a conduit body (10), a first pair of first ultrasonic transducers (16, 18) defining a first swirl sensitive acoustic path (20) and a second pair of second ultrasonic transducers (24, 26) defining a second swirl sensitive acoustic path (28), a third pair of third ultrasonic transducers (30, 32) and a fourth pair of fourth ultrasonic transducers (36, 38) the transducers (30, 32) of the third pair being positioned diametrically opposite to each other at the wall (14) of the conduit body (10) such that the third transducers (30, 32) define a third acoustic path (34) having a single reflection against the inner (12) wall of the conduit body (10) and the transducers (36, 38) of the fourth pair being positioned diametrically opposite to each other such that the fourth transducers (36, 38) define a fourth acoustic path (40), wherein the transducers (16, 18; 24, 26; 30, 32; 36, 38) are capable of acting individually as a transmitter and receiver for transmitting ultrasonic waves along their respective acoustic paths and receiving thereof, means (42, 44) for measuring the transit times of transmitted ultrasonic waves and for determining a flow characteristic from the measured transit times.

10 Claims, 2 Drawing Sheets

DEVICE AND METHOD FOR DETERMINING A FLOW CHARACTERISTIC OF A FLUID IN A CONDUIT

BACKGROUND

The present invention relates to ultrasonic flow measurement, in particular a device and method for measuring a flow characteristic, e.g. the flow velocity and/or throughput of a fluid in a conduit.

Ultrasonic flow measurement of fluids flowing in a conduit is generally known in the art. Basically it comprises transmitting ultrasonic sound waves between a transmitter and a receiver, that are spaced apart in axial direction of a conduit, in a downstream direction of the fluid flow and in the upstream direction thereof. The transit time of the ultrasonic waves is measured. From the difference in transit time of the downstream directed ultrasonic wave and the upstream directed wave an average flow velocity or throughput can be calculated based on a known geometry of the conduit. The fluid is a gas, vapour or liquid, such as natural gas.

In addition to the flow velocity, the transit time as measured is dependent from the flow profile of the fluid in the conduit. Swirl, cross flow, profile, asymmetry and a velocity fluctuating in time are known distortions from an ideal flow profile, which frequently occur in practice, e.g. in complex piping structures, after bends and the like.

The ultimate reliability of the flow velocity as measured and calculated depends on many parameters, like the distance covered, the acoustic path configuration, transmitted ultrasonic wave type and the calculation method itself. Many acoustic path configurations are known in the art.

One of the known acoustic path configurations is a triangular path having midradius chords, wherein the ultrasonic wave transmitted by the transmitter reflects twice at the inner conduit wall prior to being received by the receiver. E.g. U.S. Pat. No. 5,546,812 has disclosed a method and device for determining characteristics of the flow of a medium in a channel, comprising a transducer arrangement defining two triangular paths offset to each other for swirl determination and three single reflection axial paths also offset to each other for (a) symmetry determination. In commercially available flow meters according to this patent, the first triangular path has a clockwise orientation and the second triangular path has a counter clockwise orientation.

Yet another path configuration known from e.g. EP 0 843 160 A1 comprises at least one first path through the centre of the conduit, at least one second path in the form of an inscribed triangle and at least one third path having three or more reflections against the wall of the conduit. This known path configuration is directed to obtaining a curve of composite weighting factors used in calculating the flow velocity/throughput as close as possible to the ideal weighting factor. It is said that a reduction of the inaccuracy to about 0.15% could be achieved.

The requirements regarding accuracy and reliability of the measured results still increase. Frequently, improving accuracy and reliability if possible at all, is accompanied by a disproportionate increase of complexity and thus costs of the device.

SUMMARY

It is an object of the invention to provide an ultrasonic flow measurement device and method allowing increasing the gathering of information of the actual flow profile of a fluid flowing in a conduit, as well as increasing the interrogation area, while simultaneously allowing a relatively simple design of the device.

Another object of the invention is to provide an ultrasonic flow measurement device having an excellent performance with respect to accuracy and reliability at a minimum number of transducers.

The device according to the invention is defined in claim 1. Preferred embodiments are defined in subclaims.

The device for determining a flow characteristic, in particular flow velocity and/or throughput of a fluid flowing in a conduit comprises a conduit body. On or in the outer wall of the conduit body, usually having a circular cross-section, ultrasonic transducers are mounted. The device according to the invention comprises a first set of transducers. The transducers axially spaced apart are capable of transmitting ultrasonic waves along a first swirl sensitive acoustic path (the trajectory between the transducers concerned, irrespective of the direction, upstream or downstream, of the sound waves that are transmitted along the trajectory). Thus the first swirl sensitive acoustic path has an axial component. A second set of transducers defines a second swirl sensitive path and is present at the same side of the conduit body as the first set of transducers. Due to space requirements of the transducers practically the first alignment line and the second alignment line both parallel to the conduit body axis are tangentially offset over a very small angle and/or the transducers of the first pair are axially offset over a small distance with respect to the transducers of the second pair of transducers. Preferably the first and second lines are at the same position. The transducers are arranged such that the first and second acoustic paths together have a clockwise (CW) and a counter clockwise (CCW) direction as seen in axial direction. Such a pair of swirl sensitive acoustic paths is also called a paired path in this application.

In order to increase the interrogation area the device according to the invention also comprises a third pair of ultrasonic transducers defining a third acoustic path having a single reflection between diametrically and axially offset transducers. A counterpart is provided by a fourth pair of ultrasonic transducers defining a fourth acoustic path being symmetrical to the third acoustic path. In other words the third and fourth paths together have a clockwise and a counter clockwise orientation respectively as viewed in axial direction. These "half square" paths located closer to the wall of the conduit than the preferred swirl sensitive paths (0.707*conduit radius vs. 0.5*conduit radius for an equilateral triangular path as the preferred swirl sensitive path) specifically allow to obtain information about the sharpness of the flow profile (e.g. axial velocity components across the cross sectional area of the conduit) and to cover an additional area of the conduit cross-section. Furthermore this configuration allows another swirl angle measurement.

Instead of each half square path having its own pair of transducers, the third and fourth paths preferably have a common set of transducers. The same applies to the first and second paths. Phased array type transducers are eminently suitable for this purpose. Such transducers are capable of focussing the acoustic energy in a certain direction. More preferably the four paths have at least one common transducer. In other words the four paths have one common end and the swirl sensitive paths have a common other end and the half square paths have a common opposite other end, which is positioned diametrically to the common other end of the swirl sensitive paths. When an acoustic burst is emitted by the at least one common transducer of the four paths, the burst signals over the first and second paths are received by the corresponding transducer of the first and second pair positioned at the same side of the conduit as the emitting transducer, while the burst signals travelling along the half square paths are received by a corresponding transducer of the third and fourth pair positioned diametrically opposite the other receiving transducer. In this way the risk of interference between the received signals is eliminated compared to a full square path. A full square path would end at the same side of the conduit body as the swirl sensitive path and additionally the transit times along a triangular path and a full square path are very close to each other. Thus interference of received signals is very likely to occur in such situation.

In yet another preferred embodiment of the device according to the invention additionally a fifth pair of ultrasonic transducers defining a swirl sensitive fifth acoustic path and a sixth pair of ultrasonic transducers defining a swirl sensitive sixth acoustic path are provided at the wall of the conduit body at the side opposite to the first and second pairs of transducers. The transducers of each fifth and sixth pairs are aligned along imaginary lines, preferably these lines do overlap, as explained with respect to the first and second pair of transducers. The fifth and sixth swirl sensitive acoustic paths together have a CW and CCW orientation and form a second set of paired paths. Preferably the transducers are arranged that this second set of paired paths is symmetrical to the first set of paired paths comprising the first and second swirl sensitive acoustic paths. Again the transducers of the pairs are axially spaced apart such that the respective acoustic paths have an axial component.

More preferably the device according to the invention also comprises a seventh and an eighth pair of transducers. The transducers of the seventh pair are mounted diametrically opposite to each other, such that the seventh acoustic path is comprises a single reflection (half square configuration). The eighth pair of transducers is similarly arranged such that the two half square paths together define a full square. The seventh and eighth paths together have a clockwise and a counter clockwise orientation respectively as viewed in axial direction. Preferably, the transducers of the seventh and eighth pairs are diametrically opposite to the transducers of the third and fourth pairs.

As discussed before, advantageously the various acoustic paths could share common transducers. More particularly, the seventh and eighth acoustic paths advantageously have common transducers. The fifth, sixth, seventh and eighth pairs preferably have at least one common transducer.

By a suitable configuration of the transducers it is possible to provide a device wherein using only two pairs of ultrasonic transducers an eight path configuration could be achieved.

In a further preferred embodiment the swirl sensitive acoustic paths comprise equilateral triangular acoustic paths.

Additional paths at the same transducer positions, e.g. axial paths, either direct or having one or more reflections, can be incorporated, using multi phased array transducers.

According to the invention also a method of measuring a flow characteristic, in particular flow velocity, of a fluid in a conduit is provided by transmitting and receiving ultrasonic waves in opposite directions along acoustic paths of a device for determining a flow characteristic according to the invention as described hereinbefore, measuring the transit times of the transmitted ultrasonic waves and determining the flow characteristic from the measured transit times.

BRIEF DESCRIPTION OF THE DRAWINGS

The invention will be explained in more detail referring to the attached drawing, wherein.

DETAILED DESCRIPTION

Figure 1:
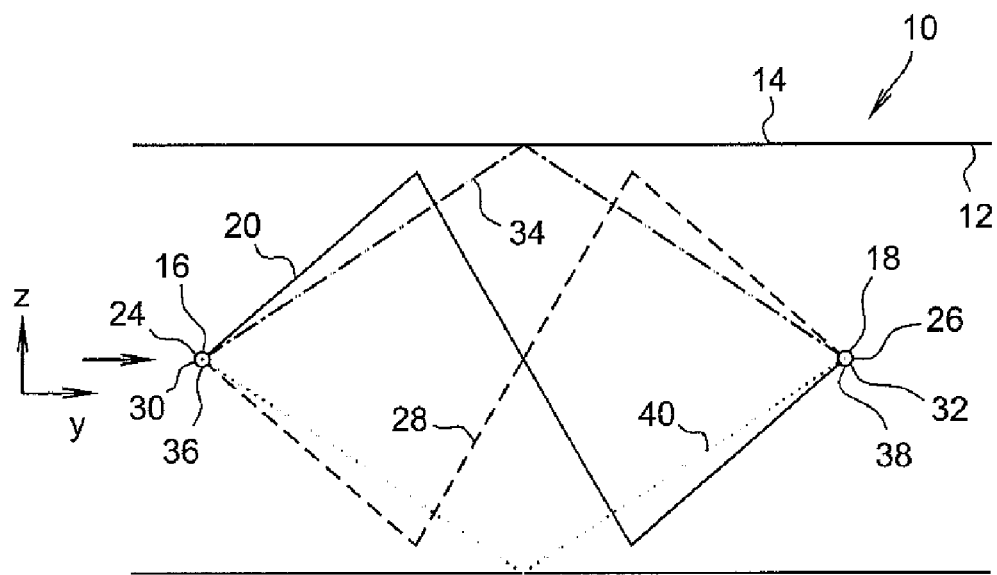
FIG. 1 is a longitudinal section of an embodiment of a device according to the invention.
Figure 2:
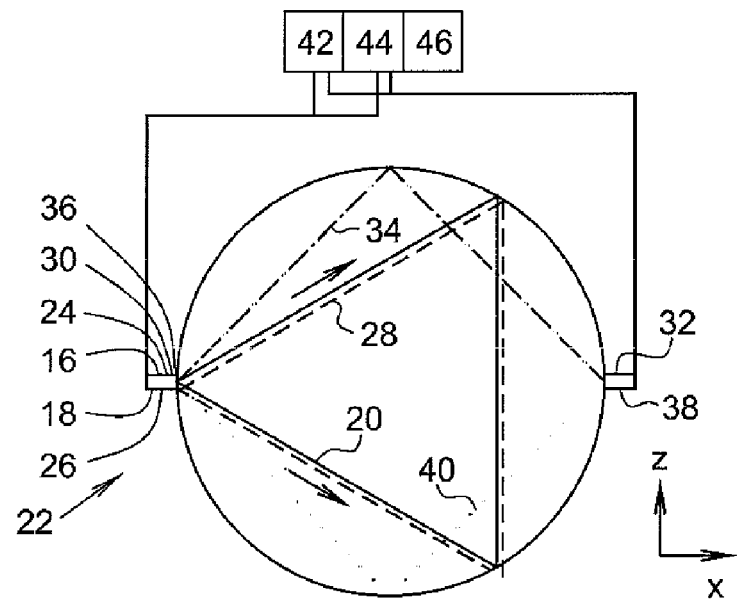
FIG. 2 is an axial view of the embodiment of FIG. 1.
Figure 3:
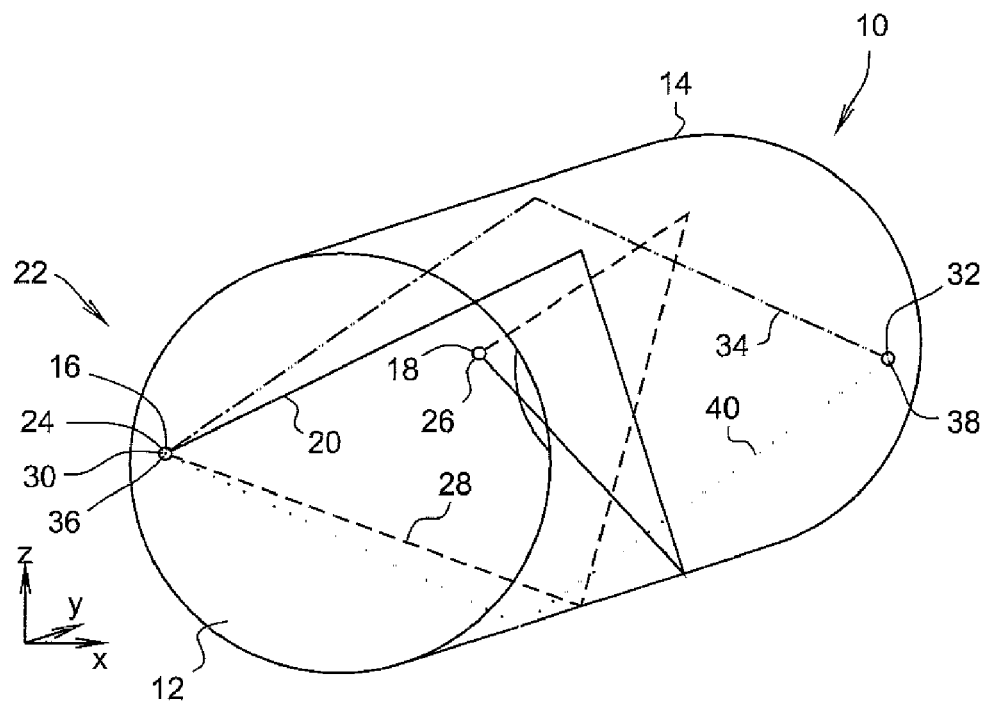
FIG. 3 is a view in perspective of the embodiment of FIG. 1.

FIGS. 1-3 diagrammatically show an embodiment of a flowmeter according to the invention. The flowmeter comprises a cylindrical conduit body 10 having an internal wall 12 and an external wall 14. A fluid e.g. natural gas flows through the interior of the conduit body 10. The direction of flow is indicated by an arrow. A first pair of first transducers 16 and 18 respectively is arranged at the left side 22 of the conduit body 10 at half its height. The transducers 16 and 18 are aligned along an imaginary alignment line parallel to the conduit axis and are axially spaced apart by a distance 1. The first transducers 16 and 18 define a swirl sensitive acoustic path 20 shaped as an equilateral triangle stretched in axial direction. Thus an ultrasonic wave transmitted by any one of the first transducers 16 and 18 bounces twice against the inner wall 12 prior to being received by the other one of the pair of first transducers. A second pair of second transducers 24 and 26 is also situated at the same side 20 of the conduit body 10 defining a swirl sensitive second acoustic path 28, also having the shape of an equilateral triangle stretched in axial direction. In the preferred situation as shown the first transducers and second transducers 16, 24 and 18, 26 respectively are at the same positions. The use of a single multi faced or phased array type transducer at each position would approach this ideal situation almost completely. The transducers 16, 18 and 24, 26 respectively are arranged such that the respective paths 20 and 28 have a clockwise and counter clockwise orientation as viewed in axial projection. For sake of clarity the overlapping acoustic paths 20 and 28 are shown apart in the axial projection of FIG. 2. A third pair of third transducers 30, 32 are mounted to the wall 14 of the conduit body 10 at positions diametrically opposite to each other and axially offset over a distance 1 as well. The third pair of third transducers 30, 32 defines a single reflection third acoustic path ("half square") 34. A fourth pair of fourth transducers 36, 38 is similarly mounted and defines a fourth acoustic path 40 having a single reflection against the inner wall 12. The third and fourth acoustic paths 34, 40 are symmetrical (in this case horizontal mirror plane defined by the transducers pairs and conduit body axis). Control means 42 including timing circuitry (not shown separately) for controlling the transmission of ultrasonic waves or bursts thereof are connected to the transducers, as well as measuring means 44 for measuring the transit times from the signals received from the transducers and computation means 46 for calculating a flow characteristic of the fluid, such as flow velocity. These device parts are only shown in FIG. 2.

The paired swirl sensitive acoustic paths 20 and 28 allow an accurate determination of swirl, but might cause an under-reading or overreading of the average flow velocity if the fluid has an asymmetric flow profile, e.g. a higher velocity in the right half (positive x-axis) of the conduit body. Moreover the swirl sensitive acoustic paths 20 and 28 do not extend into the right half of the conduit body. The half square acoustic paths 34, 40 covering additional area of the conduit cross-section provide additional information about the flow profile, thereby enabling a more accurate determination and calculation of the flow velocity.

As one end of all four paths is at the same position, the respective transducers 16, 24, 30, 36 are provided by a single multi phased array type transducer.

Figure 4:
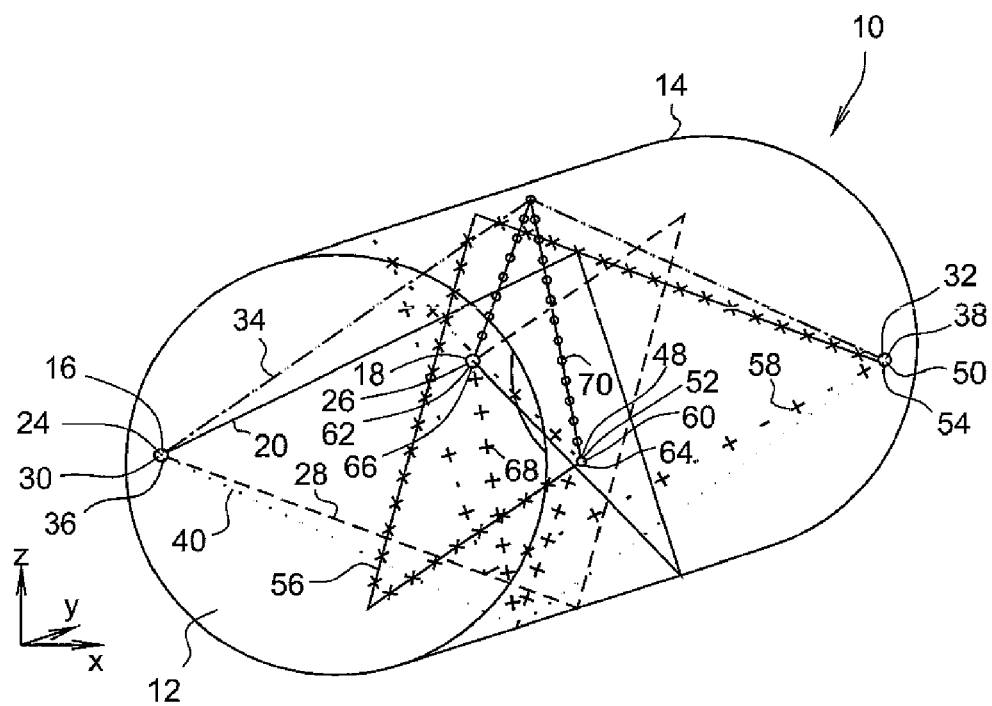
FIG. 4 is a view in perspective of a further embodiment of a device according to the invention.

FIG. 4 shows a preferred embodiment of an 8-paths flowmeter according to the invention. Parts identical to those of FIGS. 1-3 have the same reference numerals and need not to be discussed again. This preferred embodiment comprises a fifth pair of fifth transducers 48, 50 and a sixth pair of sixth transducers 52, 54 arranged axially spaced apart at the right-hand side of the conduit body 110, diametrically opposite to the transducers of the first and second pairs. The fifth transducers 48, 50 define a swirl sensitive fifth acoustic path 56 mirror-symmetrical to the first path 20. The sixth transducers 52, 54 together define a swirl sensitive sixth acoustic path 58, which is mirror-symmetrical to the second acoustic path 28. Similarly the single reflection acoustic paths 34, 40 have mirror-symmetrical counter parts. That is to say, a seventh pair of seventh transducers 60, 62 is mounted at the position of the upstream fifth and sixth transducer 48, 52 and downstream first and second transducer 18, 26 respectively. The eighth pair of eighth transducers 64, 66 is similarly arranged. Together the seventh and eighth half square paths 68 and 70 form a full square.

In this preferred embodiment having a fully symmetrical and half square paths design all the 8 paths are preferably provided by 4 transducer positions using single multi faced or phased array type transducers.

What is claimed is:

1. Device for determining a flow characteristic of a fluid in a conduit, comprising: a conduit body, a first pair of first ultrasonic transducers aligned along a first line at the wall of the conduit body and defining a first swirl sensitive acoustic path and a second pair of second ultrasonic transducers aligned along a second line at the wall of the conduit body and defining a second swirl sensitive acoustic path, the first and second lines being parallel to the conduit body axis and at the same side of the conduit body, the first and second swirl paths having a clockwise and a counter clockwise orientation respectively as viewed in axial direction, a third pair of third ultrasonic transducers and a fourth pair of fourth ultrasonic transducers the transducers of the third pair being positioned diametrically opposite to each other at the wall of the conduit body and spaced apart in the axial direction such that the third transducers define a third acoustic path having a single reflection against the inner wall of the conduit body and the transducers of the fourth pair being positioned diametrically opposite to each other at the wall of the conduit body and spaced apart in the axial direction such that the fourth transducers define a fourth acoustic path, the fourth acoustic path being symmetrical to the third acoustic path, the transducers of each pair being arranged spaced apart in the axial direction of the conduit body, the acoustic paths extending in the axial direction of the conduit body, wherein the transducers are capable of acting individually as a transmitter and receiver for transmitting ultrasonic waves along their respective acoustic paths and receiving thereof, and means for measuring the transit times of transmitted ultrasonic waves and for determining a flow characteristic from the measured transit times.

2. Device according to claim 1, wherein the transducers of the third and fourth acoustic paths are single multi faced transducers.

3. Device according to claim 1, wherein the transducers of the first and second acoustic paths are single multi faced transducers.

4. Device according to claim 1, wherein the four paths have at least one single multi faced transducer.

5. Device according to claim 1, further comprising a fifth pair of fifth ultrasonic transducers aligned along a fifth line at the wall of the conduit body defining a swirl sensitive fifth acoustic path, a sixth pair of sixth ultrasonic transducers aligned along a sixth line at the wall of the conduit body defining a swirl sensitive sixth acoustic path, the fifth and sixth lines being parallel to the conduit body axis and at the same side of the conduit body opposite to the side of the transducers of the first and second pairs of transducers, the fifth and sixth swirl sensitive acoustic paths having a clockwise and a counter clockwise orientation respectively as viewed in axial direction, the transducers of the fifth and sixth pairs being arranged spaced apart in the axial direction of the conduit body, the fifth and sixth acoustic paths extending in the axial direction of the conduit body.

6. Device according to claim 5, further comprising a seventh pair of seventh ultrasonic transducers and an eighth pair of eighth ultrasonic transducers, the transducers of the seventh pair being positioned diametrically opposite to each other at the wall of the conduit body and spaced apart in the axial direction such that the transducers define a seventh acoustic path having a single reflection against the inner wall of the conduit body and the transducers of the eighth pair being positioned diametrically opposite to each other and spaced apart in the axial direction such that the transducers define an eighth acoustic path, the eighth acoustic path being symmetrical to the seventh acoustic path.

7. Device according to claim 6, wherein the transducers of the seventh and eighth pairs of transducers are positioned diametrically opposite to the transducers of the third and fourth pair.

8. Device according to claim 1, wherein the paths are defined by two pairs of phased array type transducers.

9. Device according to claim 1, wherein the swirl sensitive acoustic paths comprise triangular acoustic paths.

10. Method of measuring a flow characteristic of a fluid in a conduit comprising: transmitting and receiving ultrasonic waves in opposite directions along acoustic paths of a device for determining a flow characteristic according to claim 1, measuring the transit times of the transmitted ultrasonic waves and determining the flow characteristic from the measured transit times.

\* \* \* \* \*